March 19, 1957     O. L. WESTGATE     2,785,841
NON-DRIP CONTROLLABLE-FLOW BOTTLE AND CLOSURE
Filed Dec. 22, 1954
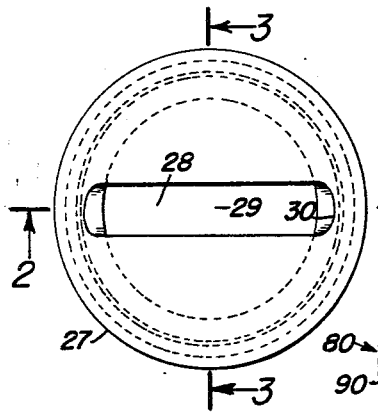
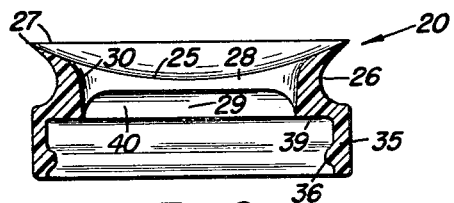
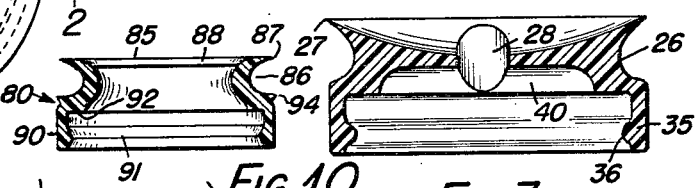
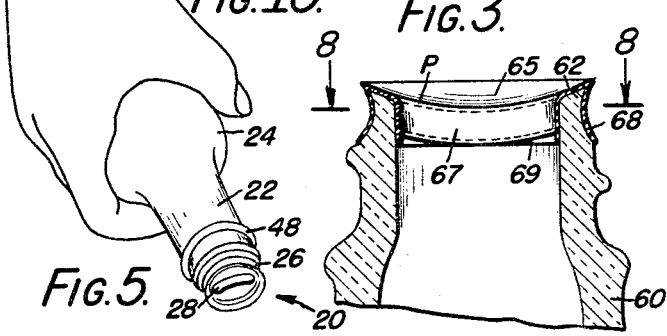
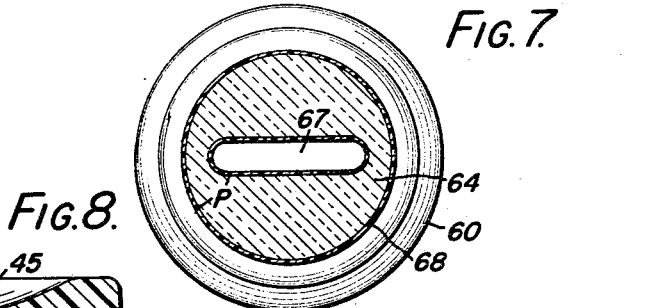
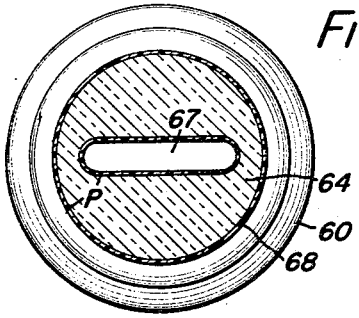
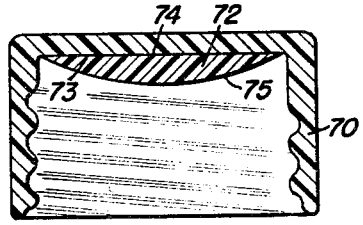
INVENTOR.
OSCAR L. WESTGATE
BY
ATTORNEY

# United States Patent Office 2,785,841
Patented Mar. 19, 1957

2,785,841

NON-DRIP CONTROLLABLE-FLOW BOTTLE AND CLOSURE

Oscar L. Westgate, Pittsford, N. Y., assignor to The R. T. French Company, Rochester, N. Y., a corporation of Delaware Application December 22, 1954, Serial No. 476,970

11 Claims. (Cl. 222—545)

The present invention relates generally to containers for liquids such is Worcestershire sauce, flavoring extracts, salad oil, syrups and the like. More particularly, the invention relates to dispensing devices for controlling the flow of liquid from bottles and similar liquid containers.

Conventional bottles for dispensing Worcestershire sauce, have short, straight, small-bored spouts inserted in their mouths, or have cap-like devices snapped over their mouths which are formed with short, integral, small bored protrusions or spout, through which the sauce is dispensed. To dispense the sauce, the bottle must be shaken rather vigorously. As a result there is no good control over the amount of sauce dispensed from the bottle, and, in fact, little control over the area of the meat, to which the sauce is to be applied. Furthermore, with conventional dispensing devices, the sauce drips down the sides of the bottle, making it messy and objectionable. In some instances, spout-type dispensing devices are used in bottles containing flavoring extracts; but in most cases no dispensing device is used in bottles for dispensing flavoring extracts, salad oil, syrups, and the like. This is because no satisfactory dispensing device for such goods has been heretofore devised. The result is that syrup bottles, flavoring extract bottles, salad oil bottles and the like are liable after brief use to become sticky and messy due to drippage.

A primary object of the present invention is to provide a pouring or dispensing device for a liquid container which will provide means for easily controlling the rate of flow of liquid from the container.

Another object of this invention is to provide a pouring or dispensing device for a liquid container which will prevent liquid from running down the outside of the container when the liquid is being poured.

Another object of this invention is to provide a pouring or dispensing device of the character described which will prevent dripping of the liquid down the outside of the container when the pouring operation is completed.

Another object of this invention is to provide a pouring or dispensing device of the character described which is provided with a dispensing orifice and which is so constructed that the liquid is prevented from collecting in and clogging the dispensing orifice after liquid has been poured from the container.

A further object of this invention is to provide a pouring or dispensing device of the character described which is so constructed that, after the liquid container has been righted after a pouring operation, any drops of liquid clinging to the pouring device will be guided back into the container.

A further object of this invention is to provide a pouring or dispensing device of the character described which can be readily cleaned.

A still further object of this invention is to provide a closure cap that may be used with a pouring or dispensing device of the character described and that operates to seal the container tightly when the cap is threaded on the container.

Another object of the invention is to provide a pouring or dispensing device of the character described which may be made integral with the liquid container.

Other objects of this invention will be apparent hereinafter from the specification and from the recital of the appended claims.

In the drawing:

Fig. 1 is a plan view of a pouring or dispensing device constructed according to one embodiment of this invention;

Fig. 2 is a section through this device taken on line 2—2 of Fig. 1 looking in the direction of the arrows;

Fig. 3 is a section taken on line 3—3 of Fig. 1 looking in the direction of the arrows;

Figs. 4 and 5 are perspective views on a reduced scale showing a bottle having a pouring or dispensing device constructed according to this invention mounted thereon, and illustrating how through use of this device the rate of flow of liquid from the bottle may easily be controlled;

Fig. 6 is a fragmentary, axial section showing a bottle equipped with a pouring or dispensing device constructed according to this invention, and capped by a cooperating closure cap constructed according to this invention;

Fig. 7 is a fragmentary, axial section of the neck portion of a bottle which has integral with it a pouring or dispensing means constructed according to another embodiment of this invention.

Fig. 8 is a transverse section on the line 8—8 of Fig. 7 looking in the direction of the arrows;

Fig. 9 is an axial section of a closure cap adapted to be used with the bottle of Fig. 7;

Fig. 10 is an axial section of a pouring or dispensing device constructed according to a still further embodiment of my invention.

Referring now to the drawing by numerals of reference and first to Figs. 1 to 5 inclusive, 20 denotes generally a pouring or dispensing fitment or device constructed according to one embodiment of this invention, and designed to be mounted, somewhat like a cap, on the neck 22 of a bottle 24, or other container, (Figs. 4 to 6) to partially close the mouth thereof.

The device 20 is overall circular in shape, and is made of preferably resilient plastic, such as polyethylene, which is not wet by aqueous substances. It has a concave upper face 25 and an annular, peripheral deep undercut recess 26 which joins the upper face 25 at its top around the periphery of the device to form with the upper face 25 a sharp, overhanging lip 27.

The device has a slot 28 extending through it and diametrally across it to provide a dispensing opening. This slot 28 is preferably of uniform width from end to end, and extends at both sides of the axis 29 of the device. Preferably it extends at both ends close to the periphery of the device so as to permit, if desired, maximum rate of flow of the liquid from the container on which the dispensing device is used. The end walls 30 of the slot preferably are inclined outwardly from bottom to top, as clearly shown in Fig. 2, and on a curve inclined to the curvature of peripheral undercut 26 so as to make the lip 27 as sharp as possible at the ends of the slot.

The dispensing device is formed beneath slot 28 and undercut 26 with an integral collar portion 35 which is adapted to be snapped over the neck 22 of a bottle 24 to resiliently hold the device on the bottle. Collar portion 35 is formed with an internal rib 36 which is adapted to engage below the peripheral bead or rib 37 around the mouth of the bottle, and in a peripheral groove 38 formed externally on the neck of the bottle. Rib 36 helps to lock the dispensing device resiliently on the bottle.

The dispensing device is formed with an internal plane-faced shoulder 39 which is adapted to seat on the top of the bottle when the dispensing device is in place. Preferably the dispensing device is recessed, as denoted at 40 above shoulder 39 so as to narrow the depth of the bounding walls of slot 28 and increase the resiliency of the device.

The slot 28 in the pouring device 20 enables the bottle user to control the rate of flow of liquid from the bottle. The slot 28 is of a narrow enough width that its side walls will exert sufficient interfacial surface tension between these walls and the liquid being poured to prevent flow of liquid from the bottle unless there is sufficient pressure on the liquid to overcome that tension. This interfacial tension is, of course, enhanced by the plastic from which the fitment or device is made. Preferably the slot 28 is made of a width such that the interfacial surface tension exerted will prevent flow of the liquid from the bottle when the bottle is held vertically inverted, that is, with its mouth down. Liquid will flow from the bottle then only when it is tilted away from the vertical, and then only when the slot 28 is other than in a horizontal position.

Flow control is effected by rotating the bottle about its longitudinal axis, as shown in Figs. 4 and 5. When the bottle is held for pouring so that the slot 28 is vertical, as shown in Fig. 4, pressure of the air in the bottle on the body of liquid in the bottle will be unequal, and the liquid L will pour freely out of the then lower portion of the slot 28. This is the position of maximum rate of flow of the liquid. By rotating the bottle slowly, say for example a quarter turn, pressure tending to force the liquid out of the lowermost portion of the slot will be reduced. Thus gradually the rate of flow of liquid from the bottle can be diminished to, if desired, flow drop-by-drop. When the longitudinal axis of slot 28 is horizontal, as shown in Fig. 5, the pressure will be equal all along the length of slot 28 but insufficient to overcome the surface tension, and liquid flow will be cut off entirely.

The rate of flow of the liquid may also be controlled, when the slot 28 is in vertical position, or in any position inclined to the horizontal, by tilting the bottle. The flow is proportioned to the amount of tilt of the bottle to a horizontal plane.

Thus, it will be seen that with a pouring attachment constructed according to this invention the rate of flow of liquid from a bottle can be easily controlled. If, for example, a person wishes to use Worcestershire sauce on a steak, he or she can tilt the bottle containing the sauce to pouring position but with the longitudinal axis of slot 28 approximately horizontal. Then, the bottle can be rotated slowly about its axis until the sauce begins to flow. In this way, the person can dispense just the right amount of sauce desired with no danger of dispensing too much. The user can also hold the bottle with the slot 28 vertical or inclined at a substantial angle to the horizontal, and control the rate of flow of the liquid from the bottle by tilting the bottle more or less to a horizontal plane.

When a bottle of liquid, provided with a pouring device constructed according to this invention, is righted after pouring, there will be no dripping or dribbling of liquid down the neck or side of the bottle. This is partly achieved by the use of the wax-like plastic such as polyethylene, whose interfacial tension with the liquid tends to draw it back into the bottle; but, more particularly, it is because pouring lip 27 is deeply undercut and, therefore, pouring is sharply cut off when the bottle is turned upright. The long pouring lip 27 has a thin, sharp edge to which drops will not readily adhere. Any small drops can easily be shaken off and will not run down the neck of the bottle because the underside of the lip is deeply undercut. The top surface 25, likewise, is very smooth, and its concave formation will guide and draw back into the bottle any drops on the top of the device when the bottle has been righted after pouring. The undercutting 26 and smooth concave pouring surface 25 also make the device easy to clean.

Most liquids will not cling to polyethylene. Therefore, upon completion of a pouring operation, device 20 will be substantially liquid-free, thereby preventing drying or caking of liquid on the dispensing device or fitment. Even if the pouring device is used on a bottle containing a liquid which might cling somewhat even to polyethylene, such as a syrup, no caking problem results because the concave upper surface 25 and slot walls 30 will cause the liquid to flow back into the bottle. Moreover, the device, which is smoothly formed, can be easily cleaned. By coating the dispensing device or fitment with a silicone solution the interfacial tension between the pouring surface and the liquid to be poured can be further increased.

Any suitable type of closure cap may be provided with the fitment 20 to close the bottle on which the dispensing device is used. One form of closure cap is shown in Fig. 6 at 45. It has a skirt portion 46 that fits over the neck 22 of the bottle and that is internally threaded at 47 to thread on the external thread 48 of the bottle neck. Cap 45 is of conventional construction, except for an internal, integral dome portion 50 which has a convex underface 51 that conforms to and is adapted to fit into the concave upper surface 25 of the dispensing device of cap 20. When a closing torque is applied to cap 45, portion 50 tightly engages the top surface 25 of the dispensing device 20 thereby sealing slot 28 and the bottle.

The length of the slot 28, the thickness of lip 27, etc. can be varied as desired. The dispensing device can also be otherwise varied in structure. Thus, instead of forming the pouring device with a collar or skirt 35 adapted to snap over and surround the neck of a liquid container, as described, the device can be formed with a friction sleeve portion adapted to be pressed into the mouth of the bottle. The device can be provided with an external rib to engage an internal groove in the inside of the bottle neck. However, such a rib is not essential since the resiliency of the plastic device will if it is of proper diameter supply sufficient power to hold the device in place.

Figs. 7 and 8 show a further modification of the invention. Here a bottle 60 is shown fragmentarily that has integrally formed pouring means. The dispensing device is molded as a partial closure integral with the bottle itself. The mouth of the bottle is formed with a sharp, peripheral lip 62 and with an integral dispensing member 64. Member 64 has a concave upper face 65 and is diametrically slotted at 67. The neck of the bottle is undercut at 68 below lip 62, similarly to undercut 26 (Figs. 2, 3 and 6). However, undercut 68 need not be as deep as undercut 26, for ease of manufacture. The length of slot 67 is not as great either as the length of slot 28 for the same reason.

The top, orifice end of the bottle is preferably dipped or sprayed with a suitable material, such as plastic or a silicone solution, in order to increase the interfacial tension between the pouring surfaces and the liquid to be poured. The coating thus applied is indicated at 68. It covers both the top and bottom faces 65 and 69, respectively, of the integral, partial closure 64, the walls of slot 67 in the partial closure 64 and the peripheral surface of the neck of the bottle adjacent its mouth.

The flow of liquid from the bottle 60 is controlled in the same manner as with the pouring attachment previously described. When the bottle is held in pouring position with the slot 67 vertical, liquid will pour freely from the bottle through the bottom of the slot. By tilting the bottle more or less to a horizontal plane the rate of fluid flow can be varied. By rotating the bottle on its longitudinal axis to incline slot 67 less and less to the horizontal, the rate of flow of the liquid from the bottle can also be decreased more and more. When the bottle is held in pouring position with the slot 67 horizontal, the liquid will cease to flow from the bottle.

A closure cap, such as shown at 70 in Fig. 9, is adapted to be used with bottle 60. This cap is threaded on the bottle neck. Cap 70 is formed with an inverted, dome-shaped liner 72 made of an inert, resilient material such as polyethylene. This liner might be formed integral with the cap, but preferably the cap is formed with a plane inside face 73 and the liner 72 is made separate from it. The liner has a plane upper face 74 to seat against plane inside face 73 of the cap. The liner has a convex lower face 75 to seat against the coated concave inside face 65 of the partial closure 64. When the cap is threaded on the bottle 60, convex face 75 of liner 72 engages concave face 65 of the dispensing, partial closure, and closes slot 67 to seal the bottle. The resiliency of the liner insures a good seal.

The type of closure cap shown at 70 is preferably used if the body of the cap is made of metal or a phenolic resin because some liquids react chemically with metals and phenolic resins. Here the domed liner 72 may be made of polytetrafluoroethylene or polyethylene, or other material inert to acids and caustics. Obviously the convex surface 51 of the cap 45, or 75 of domed liner 72, can be made slightly smaller in radius than the concave upper surface of the cooperating dispensing means thus providing for adjustment of the liner surface of the cap to the concave surface of the dispensing means on tightening up the cap.

It will be obvious also that instead of using a plastic pouring attachment for a bottle, or manufacturing a bottle with integral pouring means and then coating the end of the bottle with plastic, the container can be made entirely of plastic including the body portion, and pouring device.

Fig. 10 shows a pouring or dispensing fitment 80 made according to a further embodiment of my invention. This device, like the device of Figs. 1 to 3 inclusive, is preferably made of polyethylene, or similar preferably resilient plastic, which is not wet by aqueous substances. Like the device of Figs. 1 to 3 inclusive, it is designed to be mounted on the neck of a bottle or other container to close the mouth thereof. It has, however, a plane upper face 85; but it also has an annular, peripheral deep undercut recess 86 which joins the upper face 85 to form a sharp, overhanging lip 87 around the periphery of the device.

The device 80, like the device 20, has a slot 88 extending diametrally through it to provide a dispensing opening. This slot extends at both sides of the axis of the device. The device 80 is formed beneath slot 88 and undercut 86 with an integral collar portion 90 which is adapted to be snapped over the neck of a bottle to hold the device on the bottle. Collar portion 90 is formed with an internal rib 91 which is adapted to engage below the peripheral bead of the bottle, thereby helping lock the dispensing device on the bottle.

The device 80 has a shoulder 92 below peripheral recess 86 which at its inside seats on the top of the bottle and which forms at its outside around its periphery at its juncture with the outside peripheral surface of collar portion 90 an auxiliary lip 94. The long pouring lip 87 will tend to cut off immediately flow of liquid from a bottle, on which the device 80 is being used, once the bottle is rotated or tilted out of pouring position; but if any liquid should drip over the lip 87 it will be caught by lip 94 and prevented from running down the bottle.

A cap or closure with a flat inside surface will preferably be used with the dispensing device of Fig. 10. Thus, a closure like cap 70, but with domed portion 75 omitted, might be employed.

Although this invention has been described in connection with several different embodiments thereof, then, it will be understood that it is capable of further modification, and this application is intended to cover any variations, uses, or adaptations of the invention following, in general, the principles of the invention and including such departures from the present disclosure as come within known or customary practice in the art to which the invention pertains and as may fall within the scope of the invention or the limits of the appended claims.

Having thus described my invention, what I claim is:

1. The combination with a rotatable liquid container having a mouth through which liquid may be dispensed from the container, of means for controlling flow of the liquid from said container comprising a closure partially closing said mouth, said closure having a dispensing slot therethrough extending diametrally across said mouth to both sides of the axis about which said container is rotatable, said slot being of uniform width from end to end, and said closure having a peripheral recess beneath and adjoining the outer face of said closure and forming with said outer face a thin peripheral lip around said closure.

2. The combination with a rotatable liquid container having a mouth through which liquid may be dispensed from the container, of means for controlling flow of the liquid from said container comprising a closure partially closing said mouth, said closure having a dispensing slot therethrough extending diametrally across said mouth to both sides of the axis about which said container is rotatable, and said closure having a concave outer face and a thin-edged peripheral lip.

3. The combination with a rotatable liquid container having a mouth through which liquid may be dispensed from the container, of means for controlling flow of the liquid from said container comprising a closure partially closing said mouth, said closure having a dispensing slot therethrouhg extending diametrally across said mouth to both sides of the axis about which said container is rotatable, and said closure having a peripheral recess constituting an undercut which adjoins the outer face of said closure and forms with said outer face a peripheral thin-edged lip around said closure.

4. The combination with a rotatable liquid container having a mouth through which liquid may be dispensed from the container, of means for controlling flow of the liquid from said container comprising a closure partially closing said mouth, said closure having a dispensing slot therethrough extending diametrally across said mouth to both sides of the axis about which said container is rotatable, and said closure having a concave outer face and having a peripheral recess constituting an undercut which adjoins said concave outer face and forms with said concave outer face a peripheral thin-edged lip around said closure, said slot being of uniform width from end to end and the end walls of said slot tapering inwardly toward one another from the outer face of said closure toward the inner face thereof.

5. The combination with a bottle having a mouth through which liquid may be dispensed, of means for controlling flow of the liquid from said bottle comprising a closure partially closing said mouth, said closure having a concave outer face, and a dispensing slot therethrough extending diametrally across said mouth to both sides of the longitudinal axis of said bottle, whereby by rotating said bottle on its longitudinal axis the rate of flow of liquid from said bottle can be controlled, said bottle having a peripheral recess adjoining said concave outer face and forming with said concave outer face a thin peripheral lip around said bottle.

6. The combination with a liquid container having a tubular neck forming at its outer end a mouth through which liquid may be dispensed from said container, of a dispensing closure for partially closing said mouth, said closure having a resilient collar portion which surrounds said neck and a top portion which extends above said neck, said closure having an internal shoulder which is formed at the juncture of said collar portion and said top portion and which seats on the outer end of said container, said top portion having a transverse slot extending diametrally therethrough and having means for preventing liquid from dripping down said neck.

7. The combination with a liquid container having a tubular neck forming at its outer end a mouth through which liquid may be dispensed from said container, of a dispensing closure for partially closing said mouth, said closure having a resilient collar portion which surrounds said neck and a top portion which extends above said neck, said top portion having a transverse slot extending diametrally therethrough and having a peripheral lip surrounding said slot for preventing liquid from dripping down said neck.

8. The combination with a liquid container having a tubular neck forming at its outer end a mouth through which liquid may be dispensed from said container, of a dispensing closure for partially closing said mouth, said closure having a resilient collar portion which surrounds said neck and a top portion which extends above said neck, said top portion having a transverse slot extending diametrally therethrough and having a concave top face and a peripheral undercut, said undercut joining said top face to form a thin peripheral lip and prevent liquid from dripping down said neck.

9. As an article of manufacture, a dispensing closure for a liquid-containing bottle, comprising a generally cylindrically shaped member having a collar portion and a top portion disposed axially above said collar portion, said top portion having a concave top face, a peripheral undercut that forms with said concave top face a peripheral lip, and a diametral dispensing slot which extends through said top portion.

10. As an article of manufacture, a dispensing closure for a liquid-containing bottle, comprising a generally cylindrically shaped member having a collar portion and a top portion disposed axially above said collar portion, said closure having an internal shoulder which is formed at the juncture of said collar portion and said top portion and which is adapted to seat against the outer end of the bottle, said top portion having a concave top face, a peripheral undercut that forms with said concave top face a peripheral lip, and a diametral dispensing slot which extends through said top portion.

11. As an article of manufacture, a dispensing closure for a liquid-containing bottle, comprising a generally cylindrically shaped member having a collar portion and a top portion disposed axially above said collar portion, said closure having an internal shoulder which is formed at the juncture of said collar portion and said top portion and which is adapted to seat against the outer end of the bottle, said top portion having a plane top face, a peripheral undercut that forms with said top face a peripheral lip, and a diametral dispensing slot which is of uniform width from end to end and which extends through said top portion.

References Cited in the file of this patent

UNITED STATES PATENTS

| | | |
|---|---|---|
| 1,470,131 | Abbott | Oct. 9, 1923 |
| 2,576,416 | Randlett | Nov. 27, 1951 |
| 2,621,831 | Smith | Dec. 16, 1952 |
| 2,664,230 | Heim | Dec. 29, 1953 |

FOREIGN PATENTS

| | | |
|---|---|---|
| 524,688 | Great Britain | Aug. 13, 1940 |